United States Patent [19]

Ito

[11] Patent Number: 5,322,155
[45] Date of Patent: Jun. 21, 1994

[54] METHOD AND APPARATUS FOR SUPPLYING PARTS

[75] Inventor: Michio Ito, Toyama, Japan

[73] Assignee: Yoshida Kogyo K.K., Tokyo, Japan

[21] Appl. No.: 106,609

[22] Filed: Aug. 16, 1993

[30] Foreign Application Priority Data

Aug. 17, 1992 [JP] Japan .................................. 4-217890

[51] Int. Cl.5 .............................................. B65G 47/26
[52] U.S. Cl. ..................................... 198/460; 198/392; 198/464.2
[58] Field of Search ............. 198/392, 460, 810, 464.2

[56] References Cited

U.S. PATENT DOCUMENTS

| 3,204,765 | 9/1965 | Adcox | 198/460 X |
| 3,944,049 | 3/1976 | Graybill | 198/460 |
| 4,190,146 | 2/1980 | Knuchel | 198/460 |
| 4,961,488 | 10/1990 | Steeghs | 198/460 X |
| 5,165,520 | 11/1992 | Herve et al. | 198/460 |

FOREIGN PATENT DOCUMENTS

| 2427156 | 12/1974 | Fed. Rep. of Germany | 198/460 |
| 0051508 | 3/1987 | Japan | 198/460 |

Primary Examiner—James R. Bidwell
Attorney, Agent, or Firm—Hill, Steadman & Simpson

[57] ABSTRACT

One or more kinds of plenty scattered parts are successively fed out of an automatic feed unit. The successive parts are then conveyed at a high speed by a conveyer belt. Then, the conveying belt is automatically shifted down to a low speed when a first parts detector detects that a leading end of the successive parts being conveyed at the high speed has arrived at a forward end of the conveyer belt. The conveyer belt is then automatically stopped temporarily when a second parts detector detects that the leading end of the successive parts being conveyed has fallen from a turn end of the conveyor belt which has been shifted down to the low speed.

7 Claims, 6 Drawing Sheets

METHOD AND APPARATUS FOR SUPPLYING PARTS

BACKGROUND OF THE INVENTION

1. Field of the Invention

This invention relates to a parts supplying apparatus for automatically feeding one or more kinds of parts, such as different shapes of slider pull tabs, end stops and coupling elements for slide fasteners, or different shapes of button components, which are accommodated in a scattered and mixed fashion in a parts feed unit, successively to a subsequent station while they are separated individually, and for separating the parts in sorts.

2. Description of the Related Art

Attempts have been made to meet recent demands for production of a good assortment in a small amount. To this end, for flexible manufacturing, it has been customary to treat one or more kinds of parts at the same time, and more particularly to treat these mixed parts as a unit, with the rate of production in view, as the amount of parts of each kind is only small, and then to separate the parts in sorts prior to feeding them to a subsequent station.

Generally, this conventional separate feeding is carried out using a known parts feeder as disclosed in, for example, Japanese Patent Publication No. SHO 50-12341. The parts feeder has a basic structure in which a rotary disk is concentrically mounted on a bottom of a bottom-closed cylindrical tube fixed to a frame and is intermittently rotatable. The fixed cylindrical tube has an inside diameter slightly larger than that of the rotary disk to define a parts guide gap along the inner circumferential surface of the fixed cylindrical tube. A parts guide having an upper slant guide surface extends in the direction of rotation of the rotary disk from the bottom of the fixed cylindrical tube to its parts outlet port.

With this conventional parts feeder, plenty parts scattered over the rotary disk are moved radially on the disk towards its circumference to gather around the inner circumferential surface of the fixed cylindrical tube as the rotary disk is rotated intermittently. While the gathered plenty parts are moved circularly along the inner circumferential surface of the fixed cylindrical tube in response to rotation of the rotary disk, some of the parts will be caught and picked up by the tip end of the slant surface of the parts guide and will then climb the guide up to the parts outlet port as pushed forward by the succeeding parts picked up the next time.

However, only a few of the above-mentioned parts have simple planar shapes, and most of them have complex cubic shapes, many of which have projections at some portions and holes at the other portions. Therefore the parts would tend to get tangled with one another, while being fed along the parts guide of the parts feeder, and would occasionally remain interlocked all the way to the parts outlet port so that complete separation of the parts cannot be guaranteed.

In recent years, on many occasions, a plurality of kinds of parts different in shape are fed by the same parts feeder while being separated. In this case, these kinds of parts will be individually discharged from the parts feeder and will then be separated in sorts, whereupon the separated parts will be conveyed to the next station. However, the parts having different shapes would tend to get tangled on the parts guide of the parts feeder and to remain interlocked all the way to the parts outlet port so that unnecessary kind of parts would tend to be mixed in the next station.

SUMMARY OF THE INVENTION

It is, therefore, a primary object of this invention to provide a parts supplying method and apparatus in which different kinds of parts to be discharged from a parts outlet port of a parts feeder are separated reliably in sorts for being conveyed to the next station. Other objects of this invention will be apparent from preferred embodiments described below.

According to a first aspect of the invention, there is provided a method of supplying parts by repeating in order the following steps: automatically feeding one or more kinds of plenty scattered parts successively out of a feed unit while guiding the individual parts successively along a guide; conveying the successively fed out parts at a high speed by a conveyer belt; shifting the conveying belt down to a low speed automatically when first parts detecting means detects that a leading end of the successive parts being conveyed at the high speed has arrived at a forward end of the conveyer belt; and temporarily stopping the conveyer belt automatically when second parts detecting means detects that the leading end of the successive parts being conveyed has fallen from a turn end of the conveyer belt which has been shifted down to the low speed.

According to a second aspect of the invention there is provided a parts supplying apparatus equipped with an automatic parts feed unit for feeding one or more kinds of plenty scattered parts successively out of the automatic parts feed unit while guiding the individual parts successively along a guide and a parts separating conveyer belt situated adjacent to a parts outlet port of the automatic parts feed unit, wherein the apparatus includes first and second parts detecting means situated on a conveying surface of a forward end of the separating conveyer belt and on a turning end of the separating conveyer belt, respectively, and speed control means for shifting a driving speed of the separating conveyer belt upon receipt of a detection signal of each of the first and second parts detecting means and wherein the speed control means drives the conveyer belt at a high speed, until a leading end of the successive parts being conveyed is detected by the first parts detecting means, and shifts down the conveyer belt to a low speed upon such detection and temporarily stops driving the conveyer belt when the second parts detecting means detects that the leading end part has arrived at the turning end of the conveyer belt. This apparatus may further include a parts sorting unit situated adjacent to the parts separating conveyer belt for separating the parts in sorts.

Preferably, the parts outlet port of the automatic parts feed unit is provided with a pin retractably projecting from its parts outlet surface, the pin being capable of assuming a projected posture while the parts separating conveyer belt is driven at the low speed. In an alternative form, the parts outlet port of the automatic parts feed unit may be provided with a pin retractably projecting from its parts outlet surface, the pin being capable of assuming alternately a projected posture and a retracted posture at predetermined time intervals.

In operation, one or more kinds of parts are supplied from known parts manufacturing units onto a rotary disk, which is mounted on the bottom of the parts feed unit and is intermittently driven for rotation in one direction, simultaneously and at random.

The plenty parts randomly supplied onto the rotary disk will gather around the inner wall surface of the fixed cylindrical tube and will be moved circumferentially on the rotary disk in response to the intermittent rotation of the rotary disk. During this rotation, some of the parts will climb the guide, which extends spirally from the bottom to the upper end of the fixed cylindrical tube, as pushed all the way up to the parts outlet port along the slant guide surface by the succeeding parts. At the same time, some of the parts will fall onto the rotary disk from the guide, depending on the position of center of gravity of the individual part.

The parts arrived at the parts outlet port will then be successively transferred onto the conveyer belt, which runs at a high speed, via a transfer tray. In this specification, the "high speed" means a speed the parts feed unit. This speed difference will create a desired gap between the individual parts fed from the parts feed unit and those transferred to and conveyed by the conveyer belt.

Upon detection of a leading one of the parts, which are conveyed by the conveyer belt at the high speed, at the forward end of the belt, the first parts detecting means issues a detection signal to the belt speed control unit where the conveyer belt is shifted to a low speed, whereupon the belt will be driven to run slowly. With continued slow running, the leading part on the belt will arrive at the turning end of the belt slowly and will then fall from the belt end by gravity.

When it has detected this falling, the second part detecting means will issue a detecting signal to the belt speed control unit to temporarily stop the belt. This stopping should be set so as to take place when the succeeding parts reach a position immediately short of the belt end. Using a timer or the like, this stopping should also be set so as to continue for an adequate period of time during which the leading end part will arrive at the next station.

After the lapse of this stopping time, the conveyer belt will restart running at the high speed, and then the foregoing procedure will be repeated so that the parts being fed from the parts feed unit, as they are in contact with one another, will be separated reliably, while being conveyed by the conveyer belt, and will then be supplied successively to the next station.

If the parts sorting unit is situated contiguously to the conveyer belt, various kinds of parts being transferred from the belt as separated individually should be separated in sorts in the parts sorting unit and will then be discharged to the subsequent station.

DETAILED DESCRIPTION

Figure 1:
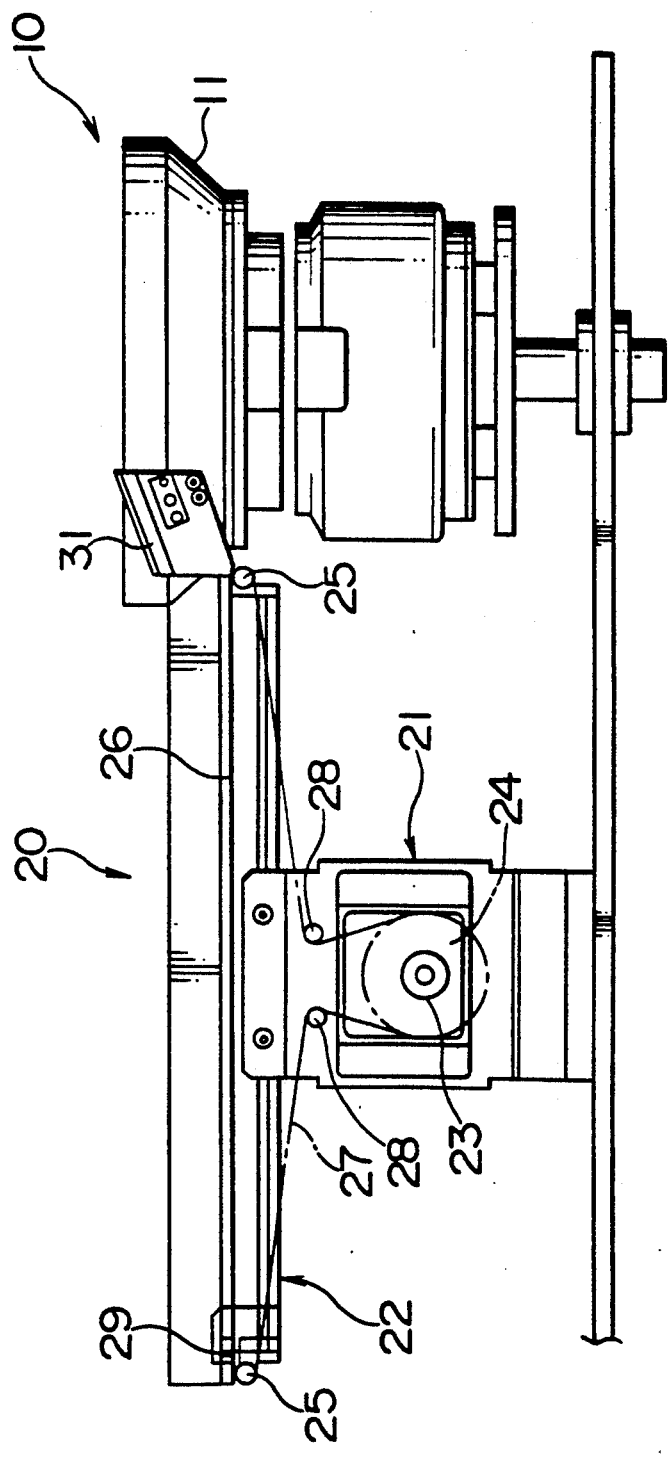
FIG. 1 is a fragmentary front view of a parts supply apparatus, showing a preferred embodiment of this invention.
Figure 2:
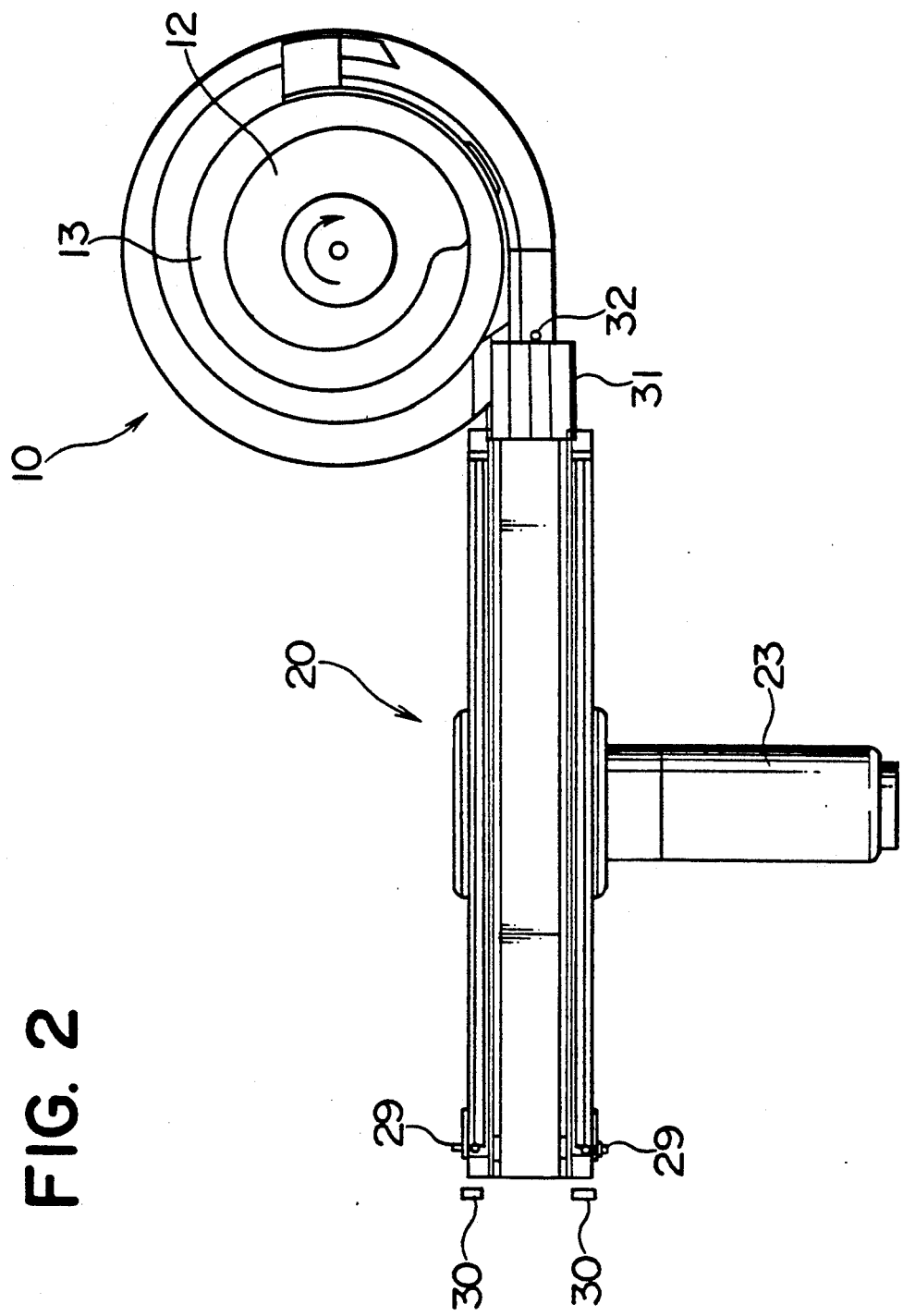
FIG. 2 is a plan view of FIG. 1.
Figure 3:
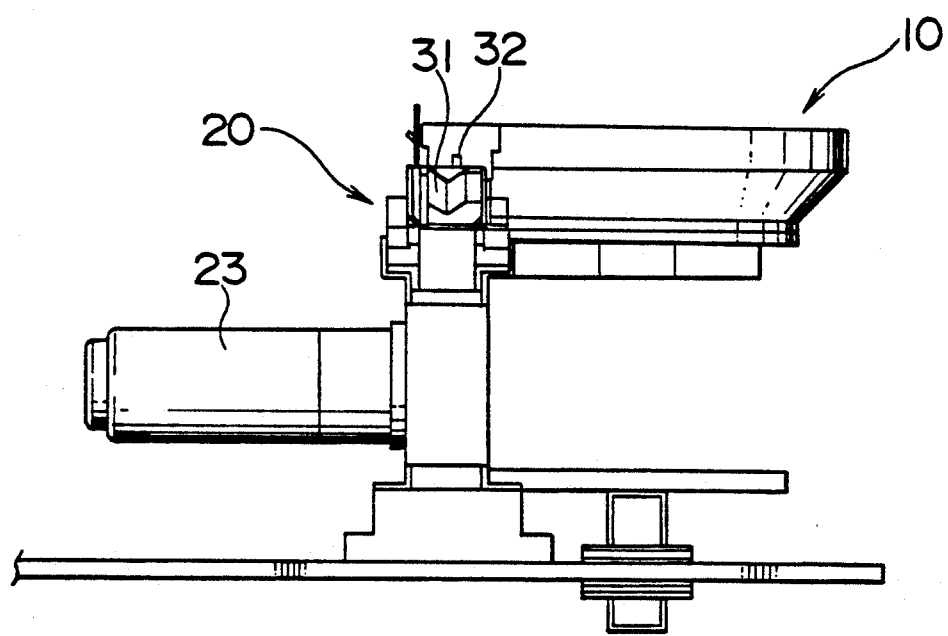
FIG. 3 is a side view of FIG. 1.

Preferred embodiments of this invention will now be described in detail with reference to the accompanying drawings FIGS. 1 to 3 show a slide fastener slider pull tab supplying apparatus according to one preferred embodiment of the invention. The apparatus is equipped with a parts feeder 10, which is an automatic parts feed unit having the conventional structure, and a parts separating conveyer unit 20, which constitutes an inventive feature of this invention.

In the illustrated embodiment, the parts feeder 10 includes a fixed cylindrical tube 11 having an inverted frustoconical shape, and a rotary disk 12 constituting the bottom of the cylindrical tube 11. On the inner circumferential wall surface of the fixed cylindrical tube 11, a parts guide 13 extends spirally from the bottom to the upper end of the tube 11. The rotary disk 12 is intermittently rotated, in a direction indicated by an arrow in FIG. 2, by a non-illustrated drive source via a known intermittent drive mechanism. Contiguously to a parts outlet port, which constitutes the exit of the parts guide 13, a transfer tray 31 is situated for transferring the parts, which have been fed from the parts feeder 10, successively to the parts separating conveyer unit 20. On the parts guide 13 at a position adjacent to the entrance of the transfer tray 31, a pin 32 to be activated by a non-illustrated cylinder is mounted. Generally, when a below-described conveyer belt 26 of the parts separating conveyer unit 20 is driven at a low speed, the pin 32 will project upwardly from the guide surface of the parts guide 13. The parts feeder 10 should by no means be limited to the illustrated example.

The parts separating conveyer unit 20, which constitutes a characteristic feature of this invention, includes a belt drive portion 21 and a belt support portion 22.

In the belt drive portion 21, a variable speed motor 23 is mounted, and a belt drive pulley 24 is attached to the output shaft of the motor 23 via non-illustrated reduction gears. The changeover of the speed of the variable speed motor 23 is controlled by a non-illustrated control unit.

The belt support portion 22 is mounted horizontally on the upper section of the belt drive portion 21 and has a pair of belt drive rollers 25, 25 at their longitudinal front and rear ends, respectively. A conveyer belt 26 is wound around the belt drive rollers 25, 25. A V belt 27 wound around the belt drive pulley 24 is wound around one side ends of respective shafts of the belt drive rollers 25, 25 via a pair of tension rollers 28, 28.

A first parts detector 29 is situated at the front end of the conveying surface of the conveyer belt 26. Upon detection of the passage of a part, the first parts detector 29 issues a signal to the control unit. This control unit then shifts the variable speed motor 23 from the high-speed driving to the low-speed driving, and at the same time, causes the pin 32 to project from the guide surface of the parts guide 13 to thereby prevent the succeeding parts from being transferred to the parts separating conveyer unit 20. During this time, superfluous parts fall onto the rotary disk 12 of the parts feeder 10 by gravity as they are pushed out on the guide surface, so that a virtually constant number of parts will stay on the guide surface always. In the illustrated embodiment, a photoelectric sensor is used for the first parts detector 29.

A second parts detector 30 is situated at a lower portion of the turning end of the conveyer belt 26. Upon detection of the parts falling by gravity from the front end of the conveyer belt 26, the second parts detector 30 activates the control unit to stop driving the conveyer belt 26. Although the second parts detector 30 also is a photoelectric sensor, an alternative type sensor may be used.

The parts separating conveyer unit 20 is situated adjacent to a transfer tray 31, which is mounted at the parts outlet port of the parts feeder 10, for conveying the parts, which slide down successively onto the conveyer belt 26 along a slant surface of the transfer tray 31, forwardly at a predetermined high speed exceeding the parts discharging speed of the parts feeder 10. Consequently, the distance between the successive parts sliding down along the slant surface of the transfer tray 31 to the conveyer belt 26 will increase on the conveyer belt 26 by an increment corresponding to the speed difference. During this high-speed running of the belt 26, the pin 32 is retracted in the guide surface of the parts feeder 10 to allow the successive parts to move onto the transfer tray 31.

Upon arrival of a leading one of the successive parts, which are being conveyed at the high speed by the conveyer belt 26, the first parts detector 29 issues a detection signal to the non-illustrated control unit of the belt drive portion 21 which then controls so as to shift the variable speed motor 23 from the high-speed driving to the low-speed driving and, at the same time, to cause the pin 32 to project from the guide surface so that the succeeding parts fed onto the parts guide 13 are temporarily prevented from being transferred to the parts separating conveyer unit 20.

When the conveyer belt 26 has thus been shifted to the low-speed running, the parts having passed the first parts detector 29 will be conveyed slowly toward the turning end of the conveyer belt 26 and will then falls by gravity upon arrival at the turning end. Having detected this falling, the second parts detector 30 issues a signal to the non-illustrated control unit to stop the variable speed motor 23.

By the stopping of the variable speed motor 23, the succeeding parts will stay on the conveyer belt 26 and hence will be completely separated from the leading end part. After the lapse of a predetermined period of time since then, the variable speed motor 23 will restart the high-speed driving and, at the same time, the pin 32 will be retracted in the guide surface of the parts feeder 10 so that the succeeding parts staying on the guide surface of the parts feeder 10 can slide down one after another onto the transfer tray 31 for transfer to the conveyer belt 26.

By repeating the foregoing operation, the individual parts are conveyed, as completely separated, to a non-illustrated subsequent station such as a predetermined section of a slider assembling station where the individual parts are assembled into complete slider bodies.

In the illustrated embodiment, the pin 32 is projected from the guide surface during the low-speed running of the conveyer belt 26 and is retracted in the guide surface during the high-speed running of the conveyer belt 26. Alternatively, the pin 32 may be controlled so as to assume a projected posture and a retracted posture alternately at a desired time difference. In this alternative example, the pin 32 should be projected from the guide surface intermittently in timed relation with the intermittent feed of successive parts so that every other parts will be pushed up by the pin 32 to fall onto the bottom of the parts feeder 10. As a result, precise interpart spaces can be created in a succession of parts being transferred to the conveyer belt 26 so that it is not so necessary to adjust the speed difference between the parts feed speed of the parts feeder 10 and the running speed of the conveyer belt 26 during the high-speed running.

Figure 4:
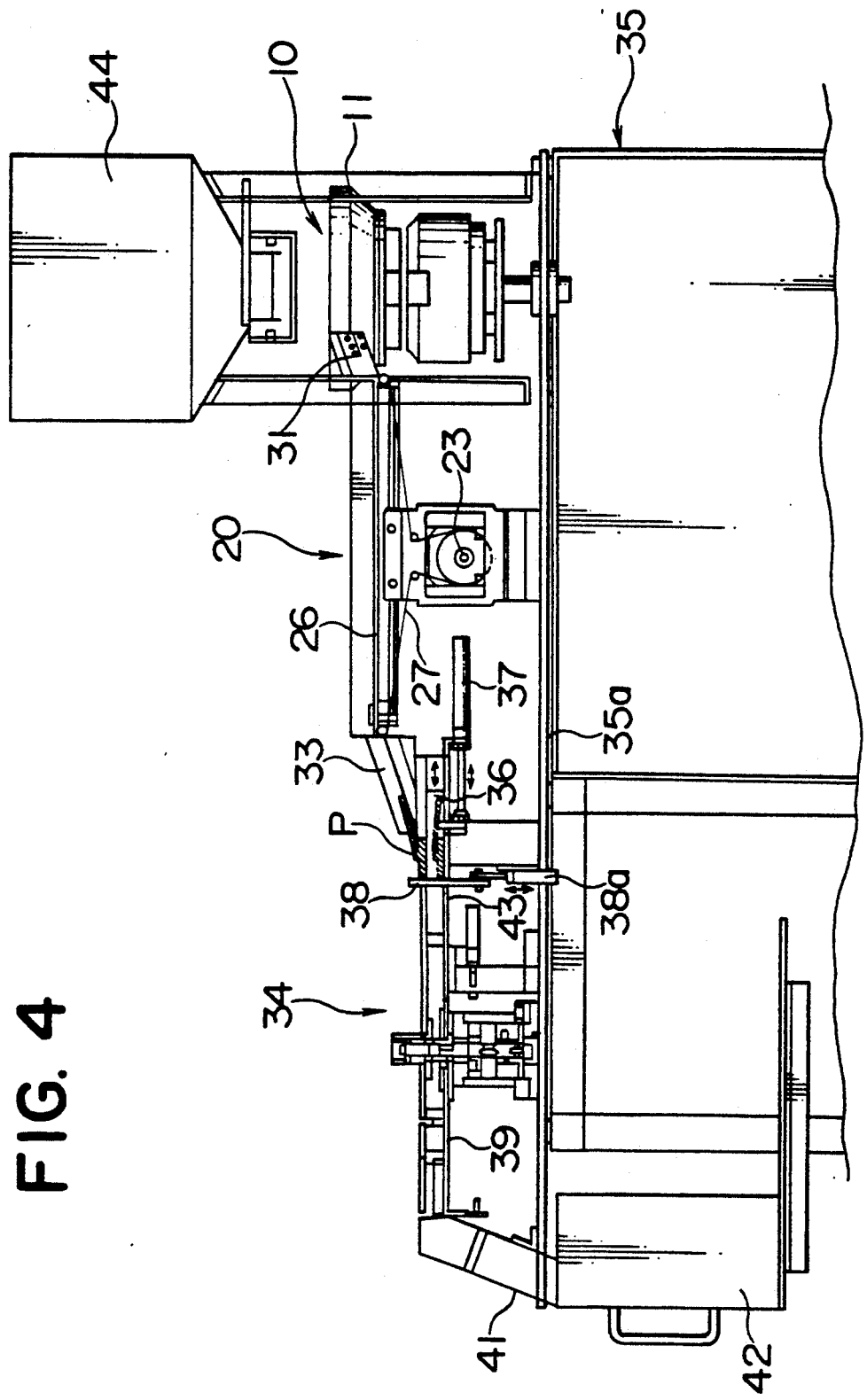
FIG. 4 is a front view of a parts supply apparatus equipped with a sorting unit, showing a second embodiment of the invention.
Figure 5:
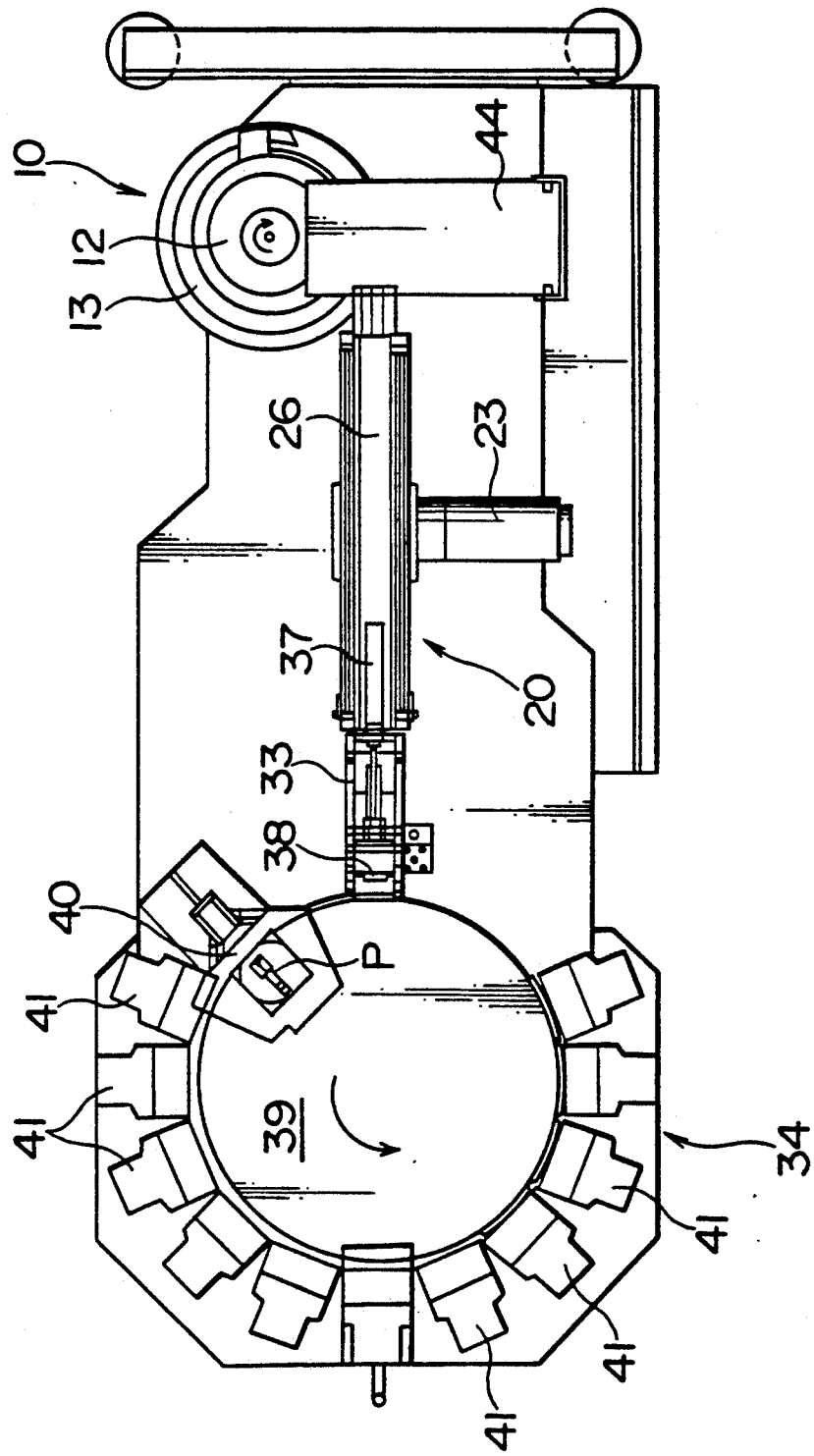
FIG. 5 is a plan view of FIG. 4.
Figure 6:
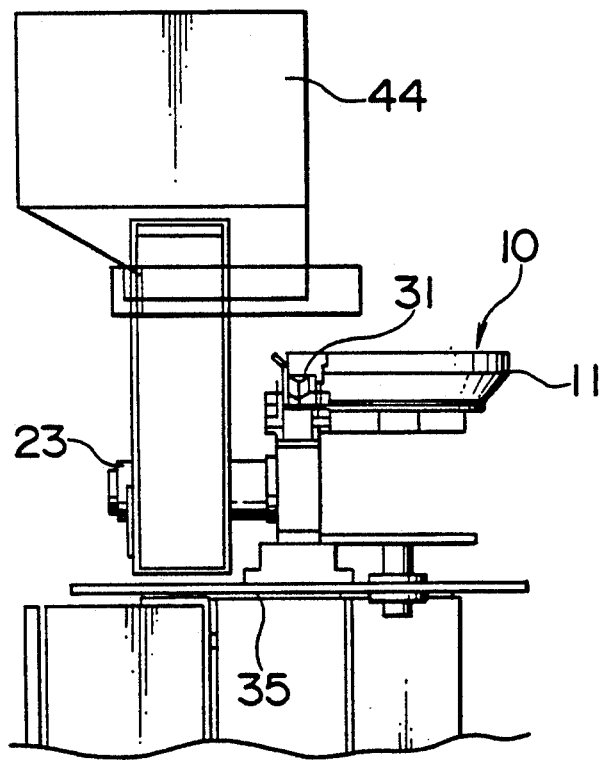
FIG. 6 is a side view of FIG. 4.

In the embodiment of FIGS. 1 to 3, a single kind of parts, e.g., the same kind of slider pull tabs are automatically supplied successively to a subsequent station, i.e., a slider assembling station. FIGS. 4 to 6 show another embodiment in which a plurality of kinds of parts, e.g., mixed different shapes of slider pull tabs are successively fed by the same parts feeder 10 and are then conveyed as separated individually and reliably, whereupon the individual parts are sorted in parts bins, each of which receives the same kind of parts.

In the embodiment of FIGS. 4 to 6, a parts sorting unit 34 is situated adjacent to the parts separating conveyer unit 20 of FIGS. 1 to 3 via a second transfer tray 33. The second transfer tray 33 is a forwardly downwardly sloping gutter-shape tray, under which a parts receiving table 36 supported by a frame 35a of a bed 35, reciprocatingly slidable worked by means of a cylinder 37 is situated. At the end of the forward stroke of the parts receiving table 36, a shutter 38 vertically movable worked by means of a cylinder 38a is situated.

At a position forwardly and adjacent to the shutter 38, the parts sorting unit 34 is situated. The parts sorting unit 34 includes a circular base 39 intermittently turnable at a predetermined angular pitch by a suitable intermittent drive means, a parts identifying unit 40 situated adjacent to the parts inlet port of the circular base 39 and utilizing the image processing technology, a number of fixed discharge trays 41 arranged around the circular base 39 except at the parts inlet port, a number of parts bins 42 situated one each under the discharge trays 41, and a number of non-illustrated parts pushing rods reciprocatingly movable radially on the upper surface of the circular base 39. In this embodiment, the parts identifying unit 40 identifies the type of a part (P) by photographing the part (P) by a camera and then electronically processing the image. Based on this result of identification, the non-illustrated control unit activates the intermittent drive means to turn the circular base 39 through a predetermined angle so that the same kinds of parts (P) are positioned in front of a desired discharge tray 41.

With the sorting unit 34, the separated parts (P) thus conveyed by the conveyer belt 26 slide down along the second transfer tray 33 and then fall onto the upper surface of the parts receiving table 36 at forwarded position. Then the parts receiving table 36 is moved backwardly so that the parts (P) on the parts receiving table 36 are transferred to a guide plate 43 that is mounted under the parts receiving table 36 in the forwarded position and is horizontally aligned with the circular base 39 of the parts sorting unit 34 At that time, the shutter 38, which is situated at the end of the forward stroke of the parts receiving table 36, assumes a projected posture to prevent the parts (P) from being supplied to the parts sorting unit 34 unnecessarily. When the parts (P) have been transferred to the guide plate 43, the shutter 38 will be retracted downwardly and, at the same time, the parts receiving table 36 is moved forwardly to transfer the parts (P) onto the circular base 39 of the parts sorting unit 34. Then the circular base 39 is rotated, in a direction indicated by an arrow in FIG. 5, to temporarily move the parts to the parts identifying unit 40 where the type of the individual part is identified. Subsequently, with continued actuation of the intermittent drive means to rotate the circular base 39 by a predetermined angle, the same kind of parts (p) will be positioned in front of a desired discharge tray 41, whereupon the non-illustrated parts pushing rod will be activated to push these parts (P) onto the discharge tray 41 so that the parts (P) are received in the parts bin.

In FIGS. 4 through 6, reference numeral 44 designates a hopper for supplying parts (P) situated above the parts feeder 10. The foregoing embodiments are only a typical illustrative example of this invention. This invention should by no means be limited to these illustrated embodiments, and so it will be understood from the foregoing description that various modifications may be suggested.

As described above, according to this invention, even when various kinds of parts rather than the same kind of parts are collected in a scattered and mixed fashion, it is possible to separate these parts reliably and then to convey the individual parts to the next station as well as to separate the individual parts in sorts.

What is claimed is:

1. A method of supplying parts by repeating in order the following steps:
   automatically feeding one or more kinds of plenty scattered parts successively;
   conveying the successively fed out parts at a high speed by a conveyer belt;
   shifting said conveyer belt down to a low speed automatically when first parts detecting means detects that a leading end of the successive parts being conveyed at the high speed has arrived at a forward end of said conveyer belt; and
   temporarily stopping said conveyer belt automatically when second parts detecting means detects that said leading end of the successive parts being conveyed has fallen from a turn end of said conveyer belt which has been shifted down to the low speed.

2. A parts supplying apparatus equipped with an automatic parts feed unit for feeding one or more kinds of plenty scattered parts successively out of said automatic parts feed unit and a parts separating conveyer belt situated adjacent to a parts outlet port of said automatic parts feed unit,
   wherein said apparatus includes first and second parts detecting means situated on a conveying surface of a forward end of said parts separating conveyer belt and on a turning end of said parts separating conveyer belt, respectively, and speed control means for shifting a driving speed of said parts separating conveyer belt upon receipt of a detection signal of each of said first and second parts detecting means, and
   wherein said speed control means drives said conveyer belt at a high speed, until a leading end of the successive parts being conveyed is detected by said first parts detecting means, and shifts down said conveyer belt to a low speed upon such detection and temporarily stops driving said conveyer belt when said second parts detecting means detects that the leading end of the successive parts has arrived at the turning end of said conveyer belt.

3. A parts supplying apparatus according to claim 2, further including a parts sorting unit situated adjacent to said parts separating conveyer belt for separating the parts in sorts.

4. A parts supplying apparatus according to claim 2, wherein said parts outlet port of said automatic parts feed unit is provided with a pin retractably projecting from its parts outlet surface, said pin being capable of assuming a projected posture while said parts separating conveyer belt is driven at the low speed.

5. A parts supplying apparatus according to claim 3, wherein said parts outlet port of said automatic parts feed unit is provided with a pin retractably projecting from its parts outlet surface, said pin being capable of assuming a projected posture while said parts separating conveyer belt is driven at the low speed.

6. A parts supplying apparatus according to claim 2, wherein said parts outlet port of said automatic parts feed unit is provided with a pin retractably projecting from its parts outlet surface, said pin being capable of assuming alternately a projected posture and a retracted posture at predetermined time intervals.

7. A parts supplying apparatus according to claim 3, wherein said parts outlet port of said automatic parts feed unit is provided with a pin retractably projecting from its parts outlet surface, said pin being capable of assuming alternately a projected posture and a retracted posture at predetermined time intervals.

* * * * *